US007472162B2

(12) United States Patent
Thompson et al.

(10) Patent No.: US 7,472,162 B2
(45) Date of Patent: Dec. 30, 2008

(54) COMMUNICATION SYSTEM ARCHITECTURE FOR VOICE FIRST COLLABORATION

(75) Inventors: Graham H. Thompson, Kanata (CA); Ashok Ganesan, Ottawa (CA)

(73) Assignee: Mitel Networks Corporation (CA)

( * ) Notice: Subject to any disclaimer, the term of this patent is extended or adjusted under 35 U.S.C. 154(b) by 1686 days.

(21) Appl. No.: 09/740,221

(22) Filed: Dec. 19, 2000

(65) Prior Publication Data

US 2001/0056466 A1 Dec. 27, 2001

(30) Foreign Application Priority Data

Dec. 23, 1999 (GB) .................................. 9930496.6

(51) Int. Cl.
*G06F 15/16* (2006.01)
*G06F 3/00* (2006.01)

(52) U.S. Cl. ..................... 709/204; 715/751; 715/753
(58) Field of Classification Search ................ 370/352, 370/356; 395/51–52
See application file for complete search history.

(56) References Cited

U.S. PATENT DOCUMENTS

| 5,742,670 | A | * | 4/1998 | Bennett | 379/142.04 |
|---|---|---|---|---|---|
| 5,761,420 | A | * | 6/1998 | Johnson et al. | 709/205 |
| 5,854,893 | A | | 12/1998 | Ludwig et al. | |
| 5,949,772 | A | * | 9/1999 | Sugikawa et al. | 370/331 |
| 6,094,681 | A | * | 7/2000 | Shaffer et al. | 709/224 |
| 6,185,184 | B1 | * | 2/2001 | Mattaway et al. | 370/230 |
| 6,192,118 | B1 | * | 2/2001 | Bayless et al. | 379/201.01 |
| 6,204,847 | B1 | * | 3/2001 | Wright | 715/804 |
| 6,614,781 | B1 | * | 9/2003 | Elliott et al. | 370/352 |
| 6,714,637 | B1 | * | 3/2004 | Kredo | 379/215.01 |
| 2001/0056466 | A1 | * | 12/2001 | Thompson et al. | 709/204 |

FOREIGN PATENT DOCUMENTS

| EP | 0 721 266 A2 | | 7/1996 |
|---|---|---|---|
| GB | 2 289 186 A | | 11/1995 |
| JP | 10133984 A | * | 5/1998 |
| WO | WO 94/24629 | | 10/1994 |
| WO | WO 97/37484 | | 10/1997 |
| WO | WO 99/55099 | | 10/1999 |
| WO | WO 00/08831 | | 2/2000 |

OTHER PUBLICATIONS

Chelliah, M. and Ahamad, M. "System Support for Robust Collaborative Applications," Aug. 1999, IEEE, pp. 525-529.*
Ionescu, Bogdan et al, "A Distributed Architecture for Collaborative Applications," Sep. 1995, IEEE, pp. 62-71.*

* cited by examiner

*Primary Examiner*—Jason D Cardone
*Assistant Examiner*—Azizul Choudhury (57) ABSTRACT

A collaborative computer telephony system, comprising a communication network; a plurality of integrated computer telephony devices connected to the network and identified by unique IP addresses, at least two of the integrated computer telephony devices supporting collaboration application programs; an indicator on at least one of the integrated computer telephony devices; and a collaborate control program associated with each of the integrated computer telephony devices for detecting commonly supported ones of the collaboration application programs and in response activating the indicator.

29 Claims, 4 Drawing Sheets

COMMUNICATION SYSTEM ARCHITECTURE FOR VOICE FIRST COLLABORATION

FIELD OF THE INVENTION

This invention relates in general to network implemented shared workspace environments, and more specifically to an apparatus and method for spontaneously setting up, between physically distant individuals, a collaborative work-sharing environment.

BACKGROUND OF THE INVENTION

Well known examples of collaborative work-share environments include video conferencing; document sharing (read only or write access); and shared "whiteboard" systems. The majority of videoconference meetings are currently implemented using expensive, dedicated equipment such as manufactured by PictureTel™. Typically, such equipment provides not only video conferencing, but also other virtual co-location tools. Because of its cost and size, this equipment is typically located in a dedicated "videoconference room", rather than at individual users' desktops. Such systems are used, primarily, as a means of reducing operating costs, such as air travel for the purpose of conducting face-to-face meetings.

Recently, much more economical, PC-based products have been introduced to the market. Examples of current products that can be used to create a shared working environment include Intel Corporation's ProShare™ and Microsoft Corporation's NetMeeting™. These PC-based products are relatively low cost (in some cases free of charge) and are sufficiently small as to enable mass deployment on every networked PC of an enterprise LAN. Unlike dedicated conference room equipment, PC-based products can be viewed as workplace enhancements, providing added value to personal communications, rather than as tools for corporate cost reduction.

In spite of the cost and space advantages of PC-based systems over prior art dedicated conferencing facilities, the PC-based products are difficult to use, especially for the majority of users who have no technical background or training. Setting up a collaborative session using existing PC-based technology typically involves cumbersome setup processes, including establishing IP-addresses, launching software etc., and are often scheduled for a date and time subsequent to the telephone discussion in which the parties agree to conduct the video conference. Furthermore, during the actual setup process, no intrinsic voice communications path exists between the parties involved. Voice communication can not take place until the setup process is complete. Using current technology, it is not uncommon for the parties to make a regular phone call in order to talk through the setup process.

SUMMARY OF THE INVENTION

According to the present invention, a system is provided for initiating a collaborative work-share environment between two or more parties to a telephone call, without complex and time consuming setup processes as are common in the prior art. In accordance with the preferred embodiment, each party to a telephone call is provided with a collaboration button and an indicator on their telephone set. When the indicator is illuminated, the system is capable of establishing a work-share environment. In response to one of the parties activating the collaboration button, the system causes network enabled applications to run on the individual users' desktop computers so that the parties are able to share information between themselves, conduct a video conference, etc., while maintaining their initial voice connection.

Thus, the telephone is used in the usual way to make regular, voice-only, telephone calls. Once a call is established, the telephones communicate with each other to determine if they each are associated with equipment which would allow richer collaboration between their respective users. If such equipment is available then the indicator on at least one of the telephones is lit, indicating that richer collaboration is possible. If the talking parties decide that they would like to share a document or set up a video conference, this may be initiated by either party pushing the collaboration button.

Once the button has been pushed, one of a number of subsequent scenarios are possible. In all cases, from a user perspective, the voice path is unaffected and the talking parties may continue uninterrupted conversation.

Some implementation examples are set forth below, without limitation to the scope of the invention. In its broadest aspects, the present invention is a method and apparatus for simple spontaneous setup of a shared workspace.

BRIEF DESCRIPTION OF THE DRAWINGS

A preferred embodiment of the present invention is described herein below with reference to the drawings in which.

DETAILED DESCRIPTION OF THE PREFERRED EMBODIMENT

Figure 1:
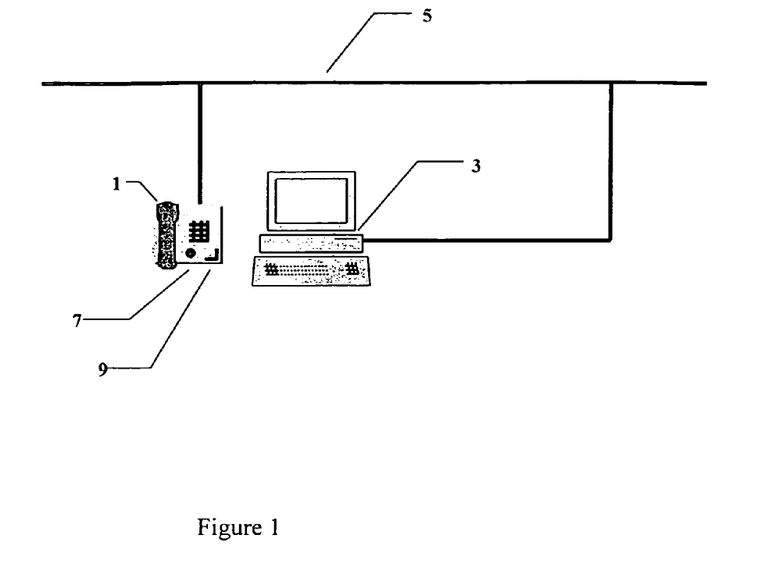
FIG. 1 is a diagram illustrating a preferred station arrangement including a telephone and a desktop PC, both of which are connected to a LAN.

Referring to FIG. 1, the preferred station arrangement comprises a telephone 1 and a PC 3, both of which are connected to a LAN 5 (Local Area Network). The telephone 1 is a component of an IP (Internet Protocol) based PBX system. In such a system, telephones, PBX hardware components, PCs and other data systems are interconnected via the LAN 5.

Critical user interface characteristics of the telephone 1 include a collaborate indicator 7, which can be in the form of an LED or other suitable visual indicator, and a collaborate button 9. The collaborate indicator 7 signals to the user that the party (or at least one party in a multiparty call) has the capability of collaborating with the user. The user may operate the collaborate button 9 if he or she wishes to run a collaboration application.

The term "collaboration", as used in this specification, refers to one of a number of desktop collaboration application programs, excluding voice, which allow for enhanced communication between one or more people via their desktop computers (PCs). The term "virtual co-location" will be used to describe the capability of these applications. Such applications typically run on the PC 3 at a user's desktop, or at least have their user interfaces on the desktop PC 3. Examples of such applications include video conferencing; multiple viewing access via remote PCs to a single document; PC based joint document editing; network "white boarding", etc. The operation of these collaboration application programs is beyond the scope of this specification although the structure and operation thereof would be well known to a person of ordinary skill in the art.

A collaboration control program runs on each PC 3 associated with a telephone 1. This program has the capability of communicating over the LAN 5 with the phone 1 to control the collaborate indicator 7 and sense actuation of the collaborate button 9. The collaboration control program includes a list of all collaboration application programs installed which have been registered with the collaboration control program on the PC 3, including information about their capabilities and communication protocols (e.g. H.323). The collaboration control program has the capability of launching a collaboration application program, or, in the event that it is already running in the background, to bring the collaboration application program to the foreground. This is accomplished using well known capabilities of the PC Operating System.

The collaboration control program also has the ability to communicate with the collaboration control programs of remote PCs via the LAN 5. It has the capability to request (or respond to a request for) a list of collaboration application programs from a remote PC via the PC's Operating System. Finally, it has the capability to compare remote and local collaboration application programs and, by comparing supported protocols, determine whether the mutual collaboration application programs can inter-operate in a shared work environment.

Figure 2:
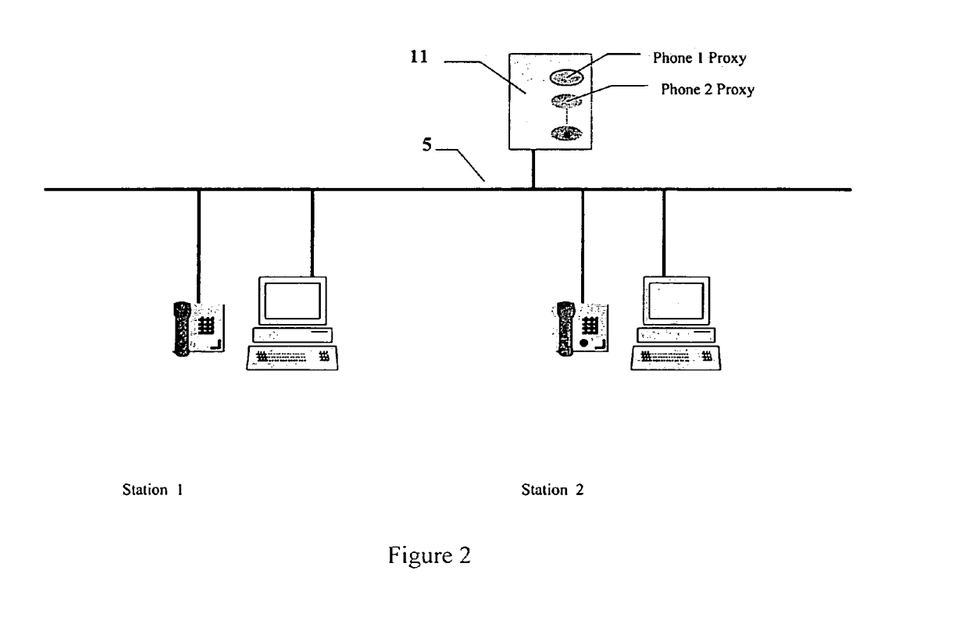
FIG. 2 shows the overall architecture of the system according to the preferred embodiment.

With reference to FIG. 2, two similar stations ("Station 1" and "Station 2"), of the variety shown in FIG. 1, are interconnected over the LAN 5 and are supported by a common call control unit 11 for implementing various telephony applications. Operation of the call control unit 11 is beyond the scope of this disclosure, although the structure and operation thereof would be well known to a person of ordinary skill in the art. The call control unit 11 includes a plurality of Phone Proxies (software objects), respective ones of which are associated with telephones registered to the system. Each Phone Proxy maintains the call state for an associated telephone and includes a database containing both the telephone Number and IP Address of the phone as well as the IP address of any PC associated with the Phone (i.e. on the same user's desktop). This IP address is typically registered once, at the time of system installation.

Figure 3:
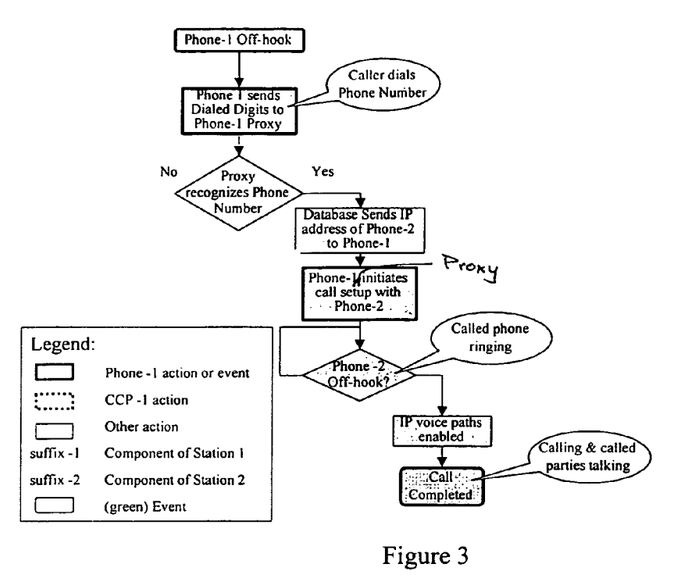
FIG. 3 is a flowchart showing steps in a call setup according to the method of the present invention.

FIG. 3 illustrates only the basic steps of a call setup, call progress tone generation (dial, ringback, busy) having been omitted for ease of explanation. Also, normal call control exceptions (e.g. Called Party Busy, No Answer, etc.), and error handling routines, have also been omitted. The terms "Phone-1" and "Phone-2" refer to combinations of specific telephone hardware and associated control software proxies, wherein Phone-1 is the calling party and Phone-2 is the called party. After Phone-1 goes off-hook and the caller dials the number of the party at Phone-2, Phone-1 sends the dialed digits to the Phone-1 Proxy running in Call Control Unit 11. Once the Proxy recognizes the dialed number, the Phone-1 Proxy then initiates call setup with Phone-2. Once Phone-2 goes off-hook, the Phone Proxy(s) send the IP address of the Phone-2 voice port to Phone-1, and vice versa, thereby enabling the phones to establish duplex voice paths, and the call is completed.

Initial setup of the collaborate indicator 7 is initiated by a Call Completed event as set forth above. The Call Complete event indicates that calling and called parties to an IP voice session are "connected". In general, this event occurs at both the calling and called party Phone Proxies, and again if additional parties are added to build a voice conference.

Figure 4:
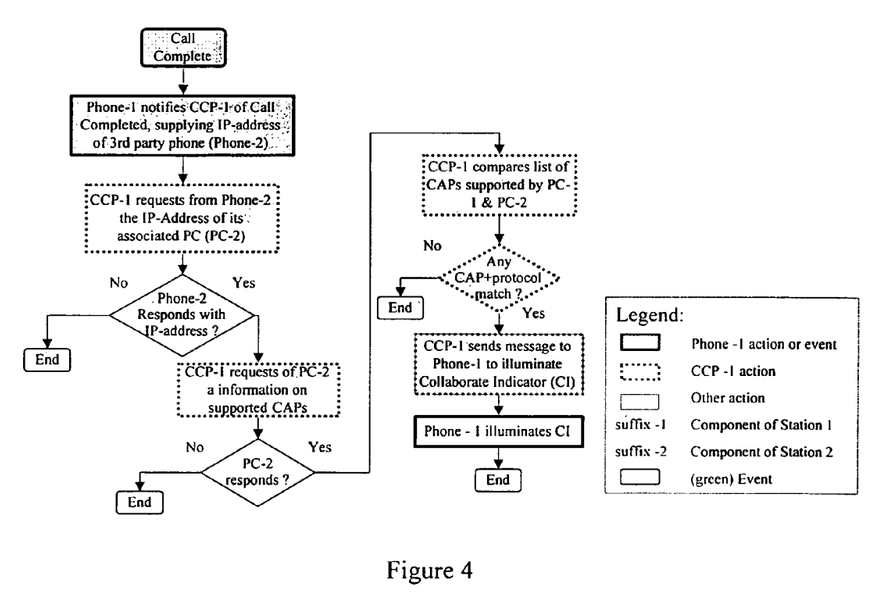
FIG. 4 is a flowchart showing steps for indicating at a telephone set availability of network collaboration between multiple parties following call setup.

As shown in FIG. 4, if both parties each have at least one common collaboration application program supporting at least one protocol in common then the collaborate indicator 7 is illuminated. Conversely, if the parties do not share a collaboration application program in common, or the situation is indeterminate, the collaborate indicator 7 will not be illuminated. Following a Call Completed event (or multiple Call Complete events if there are multiple parties to the call), the Phone-1 Proxy notifies the collaboration control program running in PC 3 of the IP address of Phone-2, and requests the IP address of its associated PC. Once Phone-2 responds with the requested IP address, the collaborate control program in the PC associated with Phone-1 requests information on collaboration application programs supported by the PC of Phone-2. More, particularly, Phone-1 requests the list of collaboration application programs maintained by the collaboration control program in PC 3 associate with Phone-2. Once that information has been received, the local collaborate control program compares its list of supported application programs with those supported by the remote PC and, in the event of at least one match, sends a message to Phone-1 to illuminate the collaborate indicator 7.

Figure 5:
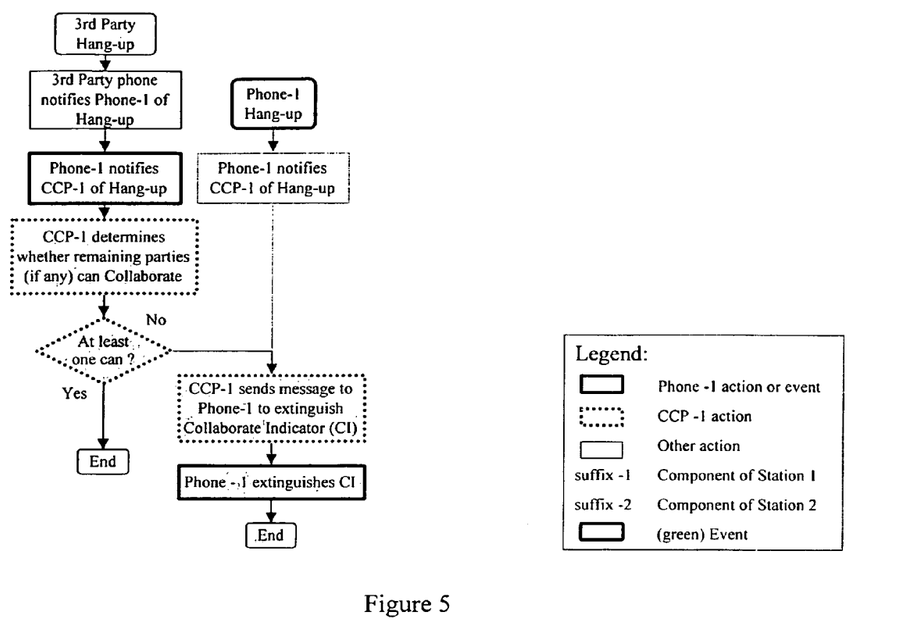
FIG. 5 is a flowchart showing steps for ceasing the indication of network collaboration availability when the call between multiple parties is being torn down.

A tear-down process occurs in the event of one party hanging-up on the call (multiple hang-up events occurring in the event of a multi-party conference), as shown in FIG. 5. The phone used by the party which is hanging up notifies Phone-1 of the Hang-up event. Phone-1 then notifies the collaborate control program of the Hang-up event. The collaborate control program determines whether any of the remaining parties to the call can collaborate, in which case the collaborate indicators remain illuminated. If there are no remaining parties capable of collaboration, or if Phone-1 hangs up, then the collaborate control program for Phone-1 sends a message to extinguish the collaborate indicator 7 at Phone-1. Thus, the collaborate indicator 7 remains illuminated provided that at least one other party remains in the call with the capability to collaborate with the initiating telephone (Phone-1).

Figure 6:
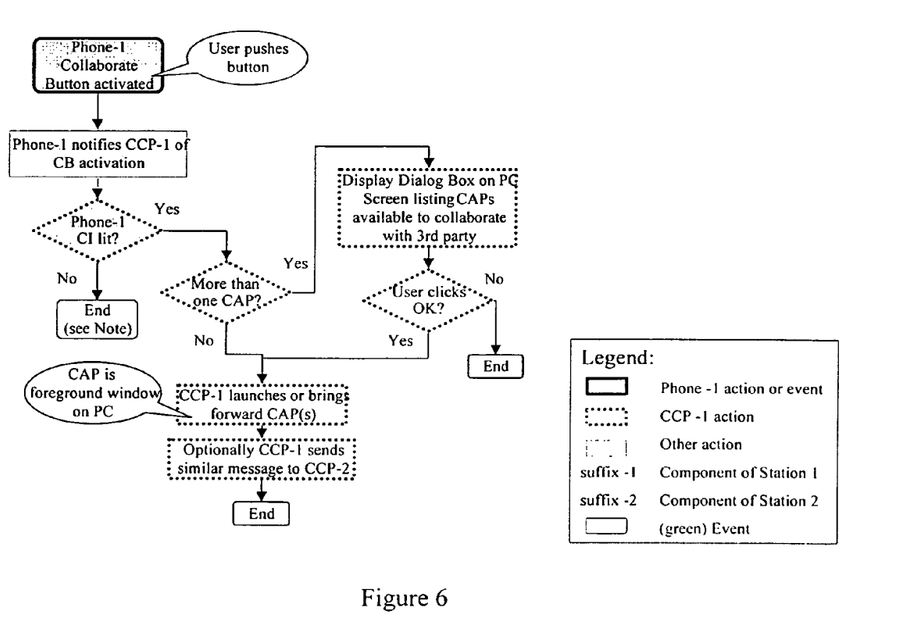
FIG. 6 is a flowchart showing steps for implementing network collaboration between multiple parties according to the invention.

Operation of the collaborate button 9 is set forth with reference to FIG. 6, from which it will be noted that the button takes no action unless the collaborate indicator 7 is lit. In response to user actuation of button 9, Phone-1 notifies its associated collaborate control program. If the local indicator 7 is extinguished, then no further action is taken. The step "Phone-1 CI lit?", may be omitted in response to user selection. If the local indicator 7 is illuminated, the collaborate control program determines whether there is more than one collaboration application program available. If not, then the collaborate control program launches or brings the collaboration application to the foreground at the user's desktop. A similar message may be sent to the collaborate control program at the remote party so that the collaborating applications launch simultaneously. If more than one collaboration application program is available, then a dialog box is displayed at the user's desktop PC 3 listing the collaboration applications available. Once the user selects an application, program flow returns to the collaborate control program for launching the application.

Figure 7:
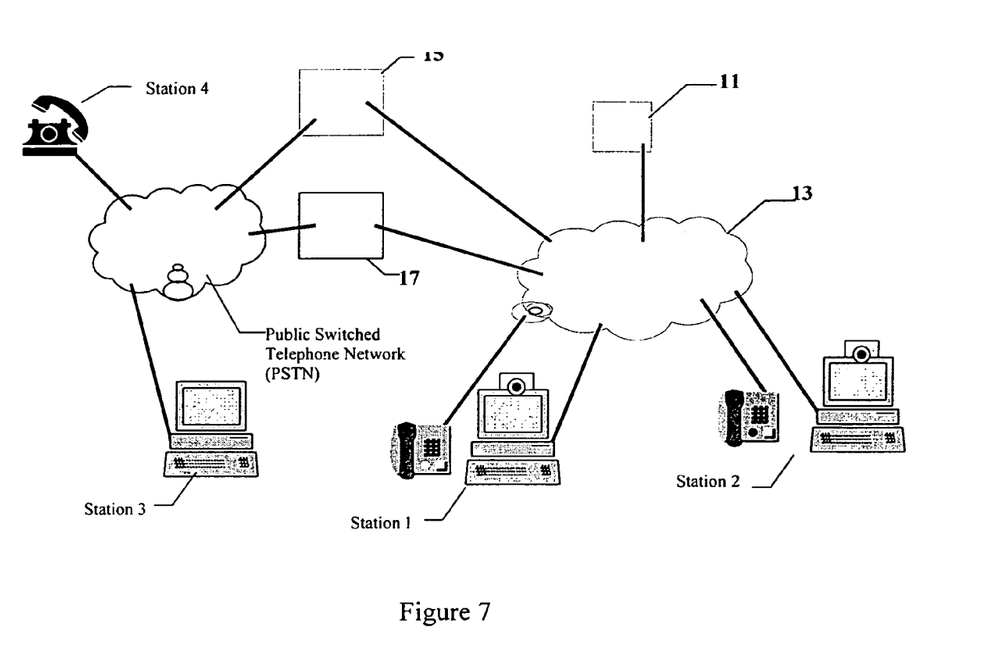
FIG. 7 shows a generalized architecture of the system according to the invention.

Referring to FIG. 7, a general architecture is presented wherein the LAN is generalized to include the Internet 13. In this case, Station 1 and Station 2 can be located anywhere geographically provided that they have Internet, or other network access. Non-Internet communications terminals (e.g. terminals located at a private home) are represented by Station 3 and Station 4.

Station 3 is illustrated as a PC with multimedia microphone and speakers and running an IP telephony protocol supported by an Internet Service Provider 15. Interconnection to the ISP is via the PSTN (Public Switched telephone Network) using an arbitrary protocol (e.g. IP/PPP/33.6 Modem or ISDN BRI). In this scenario, the function of the collaboration control program may be performed either by the ISP 15 or the PC in Station 3. If Station 1 calls Station 3, it will respond provided that it is running H.245 or other suitable protocol.

Station 4 is shown implementing a Plain Old telephone Service (POTS) termination. Station 1 can communicate with Station 4 via a PSTN gateway 17, in a well known manner. The gateway 17 may or may not respond to a collaboration control program request from Station 1. In any event, the collaboration control program of Station 1 will not recognize collaborative capabilities and the collaborate indicator of Station 1 therefore remains un-illuminated.

FAX is, arguably, the third most pervasive form of collaboration (face-to-face communication and telephone communication being the first and second most pervasive, respectively). Thus, as an alternative Station 3 and/or Station 4 of FIG. 7 may have associated FAX applications ranging from a FAX machine to FAX emulation software. In this case, it is preferred that Station 3 or the ISP 15 and PSTN gateway 17 be implemented in such a way as to respond to a capabilities query by indicating FAX capability. Similarly it is preferred that collaboration application program suite on Stations 1 and 2 include FAX capability.

Numerous alternatives and variants of the invention are possible.

Some or all of the functions described herein as being implemented via the call control unit phone proxies may be implemented physically within each telephone 1 (e.g. via a H.323 IP Phone).

Rather than using separate connections from phone 1 to LAN 5 and PC 3 to LAN 5, alternative "one wire to the desktop" configurations may be adopted. In one embodiment, the phone 1 is connected directly to the LAN 5 and the PC 3 is connected to phone 1, such that the phone 1 routes or switches PC data streams to/from the LAN 5. In the second embodiment, the PC 3 is connected directly to the LAN 5 and the phone is plugged into the PC 3, such that the PC routes or switches phone voice traffic to/from the LAN (i.e. the telephone is a PC peripheral).

It is possible to implement either the collaborate indicator 7 or the collaborate button 9 (or both) on the PC 3. For example, the collaborate indicator 7 could simply be part of an application user interface and the collaborate button 9 could be either a soft button activated with the mouse or a "function" key on the PC keyboard (i.e. similar to a client-server architecture).

The system described herein employs an identifiable call control unit 11 (e.g. Server PC). It is equally possible that the invention may be applied in a peer-to-peer architecture, (e.g. employing H.323 protocol).

The foregoing description refers mainly to two-party collaboration, however the method of this invention is applicable, with minor modifications, to multiparty collaboration.

The preferred deployment of this invention is in a system in which telephone (voice) transport is effected via the data network (e.g. using a corporate LAN, WAN, or the Internet). However, such is not a requirement for realizing the invention which, it is contemplated, could in principle be implemented on top of dedicated telephone (e.g. PBX, PSTN, ISDN), with data systems to connect telephone and PC at the desktop. The telephone 1 and PC 3 may or may not be physically connected at the desktop. Further architectural detail of this implementation are not described but would be well known to a person of ordinary skill in the art.

The present invention can be implemented by remote computers connected over a network. Although the embodiment described hereinabove has been described with reference to a separate telephone, the telephone equipment can be integrated within the computer and the indicator and collaborative button can be provided by an input device of the computer e.g. a keyboard. The voice capability of the telephone can be provided by a microphone input into the computer as is well known in the art.

Since the present invention can be implemented by a computer program operating on a computer, the present invention encompasses a computer program and any form of carrier medium which can carry the computer program e.g. a storage medium such as a floppy disk, CD ROM, programmable memory device, or magnetic tape, or a signal such as optical signal or an electrical signal carried over a network such as the Internet. A signal is understood to mean a transmission medium.

All such alternative embodiments and variations are believed to be with the scope of the invention as defined by the claims appended hereto.

What is claimed is:

1. A collaborative computer telephony system, comprising:

a communication network;

a plurality of integrated computer telephony devices connected to the network and identified by unique IP addresses, at least two of said integrated computer telephony devices supporting collaboration application programs and voice communication sessions;

an indicator on at least one of said integrated computer telephony devices, said indicator having an active state associated with the presence of at least one common collaboration application program between said at least two integrated computer telephony devices, said indicator further having an inactive state associated with at least a lack of at least one common collaboration application program between said at least two integrated computer telephony devices;

a collaborate control program associated with each of said at least two integrated computer telephony devices for detecting commonly supported ones of said collaboration application programs when said at least two integrated computer telephony devices are engaged in a voice communication session, said collaborate control program enabled for activating said indicator to said active state, in response to said detecting, thus indicating availability to initiate a collaborative work-share environment upon launching said at least one common collaboration application program, said collaborate control program further enabled to launch at least one common collaboration application program upon receiving a notification; and a phone proxy for determining IP addresses of said at least two integrated computer telephony devices and notifying said collaborate control program of said IP addresses.

2. The system of claim 1, further comprising a user input device on said at least one of said integrated computer telephony devices for launching said commonly supported ones of said collaboration application programs in the event said indicator is activated.

3. The system of claim 1, wherein said network is a local area network.

4. The system of claim 1, wherein said network is the Internet.

5. The system of claim 1, wherein said collaboration application programs include video conferencing applications, fax applications, document sharing applications, and shared whiteboard applications.

6. The system of claim 1, wherein said integrated computer telephony devices each further comprise a telephone and a computer.

7. The system of claim 6, wherein said computer and telephone are each connected directly to the network.

8. The system of claim 6, wherein said computer is connected to said telephone which in turn is connected directly to the network.

9. The system of claim 6, wherein said telephone is connected to said computer which in turn is connected directly to the network.

10. The system of claim 6, wherein said indicator further comprises a right on said telephone and said user input device is a button on said telephone.

11. The system of claim 6, wherein said indicator and user input device further comprise a graphical user interface on said computer.

12. The system of claim 1, wherein said indicator is enabled for actuation upon said activating said indicator, and said collaborate control program is enabled to detect actuation of said indicator and, in response to said actuation, launch at least one of said commonly supported ones of said collaboration application programs to initiate said active work-share environment.

13. The system of claim 12, wherein said collaborate control program is further enabled to provide a list of said commonly supported ones of said collaboration application programs and launch at least one of said commonly supported ones of said collaboration application programs in response receiving input indicative that said at least one of said commonly supported ones of said collaboration application programs has been chosen from said list 14. In a collaborative computer telephony system including a communication network, a plurality of telephones and associated computers connected to the network and identified by respective IP addresses, at least two of said computers supporting collaboration application programs, and an indicator on at least one of said telephones associated with one of said two computers a method for controlling said indicator comprising the steps of:
    establishing a voice communication session between the at least one of said telephones and at least one other telephone associated with the other of said two computers;
    exchanging IP addresses of said at least two computers over said network in response to establishing said voice communication session, said IP addresses initially received from a phone proxy for determining the addresses of said at least two computers and notifying a collaborate control program of said IP addresses;
    issuing a request from a first one of said computers to a second one of said computers for a list of said collaboration application programs supported by said second one of said computers;
    comparing said list with a further list of supported ones of said collaboration application programs within said first computer;
    activating said indicator to an active state at said first telephone in the event of at least one commonly supported ones of said collaboration application in said first and second ones of said computers, said active state associated with the presence of at least one common collaboration application program between said at least two computers, said indicator further having an inactive state associated with at least a lack of at least one. common collaboration application program between said at least two computers, such that activating indicator to said active state indicates availability to initiate a collaborative work-share environment upon launching said at least one common collaboration application program; and
    launching at least one common collaboration application program upon receiving a notification.

15. Computer telephony apparatus for use in a collaborative computer telephony system comprising a network and a plurality of terminals, said apparatus comprising:
    telephone means for establishing a voice communication session between the computer telephony apparatus and another computer telephony apparatus;
    indicator means for indicating that a collaborative session is set up with said another computer telephony apparatus, said indicator means having an active state associated with the presence of at least one common collaboration application program between the computer telephony apparatus and said another computer telephone apparatus, said indicator means further having an inactive state associated with at least a lack of at least one common collaboration application program between the computer telephony apparatus and said another computer telephone apparatus; and
    collaborative control means for detecting the presence of collaborative control means in said another computer telephony apparatus when the computer telephony apparatus and another computer telephone apparatus are engaged in said voice communication session, said collaborate control means enabled for activating said indicator means to said active state in response to said detecting, thus indicating availability to initiate a collaborative work-share environment upon launching said at least one common collaboration application program, said collaborative control means further enabled to launch at least one common collaboration application program upon receiving a notification; and
    phone proxy means for determining the addresses of the computer telephony apparatus and said another computer telephone apparatus and notifying said collaborative control means of said addresses.

16. An article of manufacture comprising:
    a computer storage medium having computer readable program code embodied therein for controlling a computer to:
    receive a request for a collaborative session with at least one second computer, said request issued in association with establishment of a voice communication session between a telephony device associated with said computer and at least a second telephony device associated with said at least one second computer;
    receive the addresses of the corn outer and said at least one second computer from a phone proxy for determining the addresses of the corn outer and said at least one second computer;

issue a request to said at least one second computer over a network for a list of collaborative programs supported by said at least second computer;

compare said list with a list of supported collaboration programs within said computer;

issue an activation signal to activate an indicator, on at least one of said telephony devices, to an active state in the event that at least one collaborative program is commonly supported by said computer and said at least one second computer, said active state associated with the presence of at least one common collaboration application program between the corn outer and said at least one second computer, said indicator further having an inactive state associated with at least a lack of at least one common collaboration application program between the computer and said at least one second computer. such that activating said indicator to said active state indicates availability to initiate a collaborative work-share environment upon launching said at least one common collaboration application program, and launch at least one common collaboration application program upon receiving a notification.

17. A collaborative computer telephony system, comprising:

a communication network;

a plurality of integrated computer telephony devices connected to the network, at least two of said integrated computer telephony devices supporting collaboration application programs for implementing collaborate application communication sessions therebetween, said at least two of said integrated computer telephony devices further supporting voice communication sessions;

a user input device on at least one of said integrated computer telephony devices;

a collaborate control program associated with each of said at least two integrated computer telephony devices for detecting commonly supported ones of said collaboration application programs when said at least two integrated computer telephony devices are engaged in a voice communication session and initiating said collaborate application communication session in response to user activation of said user input device while maintaining said voice communication session such that users associated with said at least two integrated computer telephony devices may communicate via voice while engaged in said collaborate application communication session;

a phone proxy for determining the addresses of said at least two integrated computer telephony devices and notifying said collaborate control program of said addresses; and an indicator on said at least one of said integrated computer telephony devices for indicating detection of said commonly supported ones of said collaboration application programs, said indicator having an active state associated with the presence of at least one common collaboration application program between said at least two integrated computer telephony devices, said indicator further having an inactive state associated with at least a lack of at least one common collaboration application program between said at least two integrated computer telephony devices.

18. The system of claim 17, wherein said network is a local area network.

19. The system of claim 17, wherein said network is the internet

20. The system of claim 17, wherein said collaboration application programs include video conferencing applications, fax application, document sharing applications, and shared whiteboard applications.

21. The system of claim 17, wherein said integrated computer telephony devices each further comprise a telephone and a computer.

22. The system of claim 21, wherein said computer and telephone are each connected directly to the network.

23. The system of claim 21, wherein said computer is connected to said telephone which in turn is connected directly to the network.

24. A system of claim 21, wherein said telephone is connected to said computer which in turn is connected directly to the network.

25. The system of claim 21, wherein said- indicator further comprises a light on said telephone and said user input device is a button on said telephone.

26. The system of claim 21, wherein said indicator and user input device further comprise a graphical user interface on said computer.

27. In a collaborative computer telephony system including a communication network, a plurality of telephones and associated computers connected to the network and identified by respective IP addresses, at least two of said computers supporting collaboration application programs, an indicator on at least one of said plurality of telephones and a user input device on at least one of said telephones, a method comprising the steps of:

establishing a voice connection between the at least one of said telephones and at least one other telephone of said plurality of telephones;

detecting user activation of said user input device;

receiving IP addresses of a first one of said at least two computers associated with the at least one telephone and a second one of at least two computers associated with said at least one other telephone, wherein determining said IP addresses is based on said associations;

exchanging IP addresses of said at least two computers over said network;

issuing a request from said a first one of said computers to said a second one of said computers for a list of said collaboration ,application programs supported by said second one of said computers;

comparing said list with a further list of supported ones of said collaboration application programs within said first computer;

activating said indicator to an active state in the event of at least one commonly supported ones of said collaboration application in said first and second ones of said computers, said active state associated with the presence of at least one common collaboration application program between said at least two computers, said indicator further having an inactive state associated with at least a lack of at least one common collaboration application program between said at least two computers, such that activating indicator to said active state indicates availability to initiate a collaborative work-share environment upon launching said at least one common collaboration application program; and initiating a collaborate application communication session between said first and second ones of said computers in the event of at least one commonly supported collaboration application in said first and second ones of said computers.

28. Computer telephony apparatus for use in a collaborative computer telephony system having a communication network, said apparatus comprising:
- a user input for initiating a collaborative session with another computer telephony apparatus when the computer telephony apparatus and said another computer telephony apparatus are engaged in a voice communication session while maintaining said voice communication session such that users associated with the computer telephony device and said another computer telephony apparatus may communicate via voice while engaged in said collaborative communication session; and
- collaborative control means for detecting the presence of collaborative controlled means in said another computer telephony apparatus in response to user activation of said user input;
- an indicator means for indicating that a collaborative session is set up with another computer telephony apparatus, said indicator means having an active state associated with said presence of said collaborative controlled means in said another computer telephony apparatus, said indicator means further having an inactive state associated with at least a lack of said presence of said collaborative controlled means in said another computer telephony apparatus; and
- a phone proxy for determining the addresses of the computer telephony apparatus and said another computer telephony apparatus and notifying said collaborate control means of said addresses.

29. An article of manufacture comprising:
- a computer storage medium having computer readable program code embodied therein for controlling a computer to:
  - receive a request for a collaborative session with at least one second computer when said computer and said at least one second computer are engaged in a voice communication session;
  - determine addresses of the computer and said at least one second computer and issuing a notification of said addresses;
  - issue a request to said at least one second computer over a network for a list of collaborative programs supported by said at least one second computer;
  - compare said list with a list of supported collaboration programs within said computer;
  - issue an activation signal to activate an indicator, on at least one of said telephony devices, to an active state in the event that at least one collaborative program is commonly supported by said computer and said at least one second computer, said active state associated with the presence of at least one common collaborative program between the computer and said at least one second computer, said indicator further having an inactive state associated with at least a lack of at least one common collaborative program between the computer and said at least one second computer, such that activating said indicator to said active state indicates availability to initiate a collaborative work-share environment upon launching said at least one common collaboration program and
  - initiate said collaborative session in the event that at least one collaborative program is commonly supported by said computer and said at least one second computer while maintaining said voice communication session such that users associated said computer and said at least one second corn outer may communicate via voice while engaged in said collaborative session.

* * * * *